July 26, 1960
W. J. HORVATH
2,946,117
ASSEMBLY MACHINE
Filed July 26, 1955
2 Sheets-Sheet 1
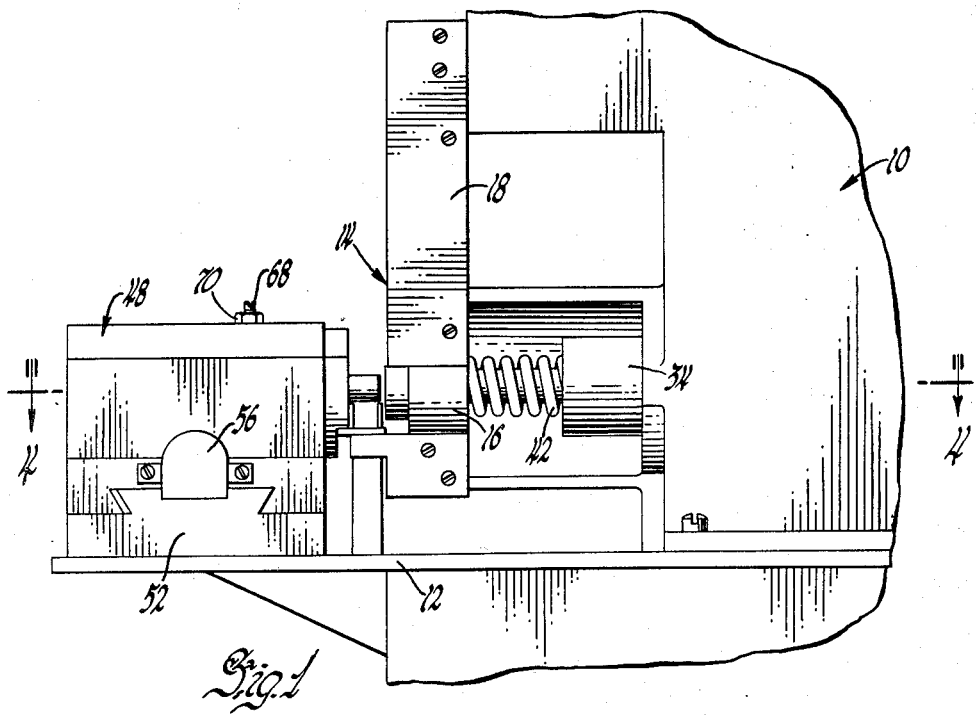
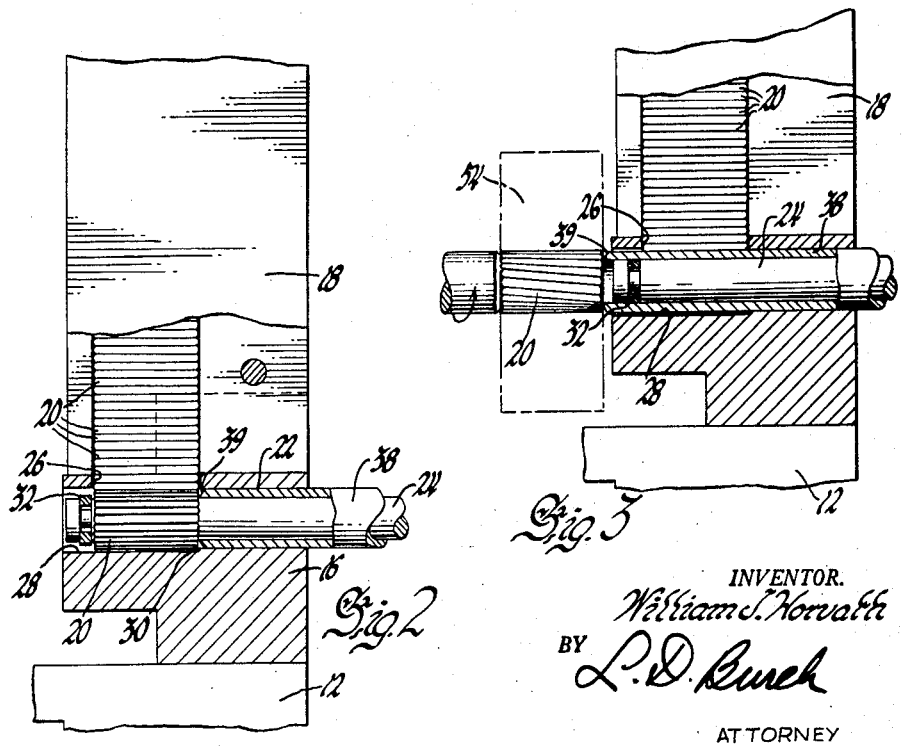
INVENTOR.
William J. Horvath
BY
L. D. Burch
ATTORNEY

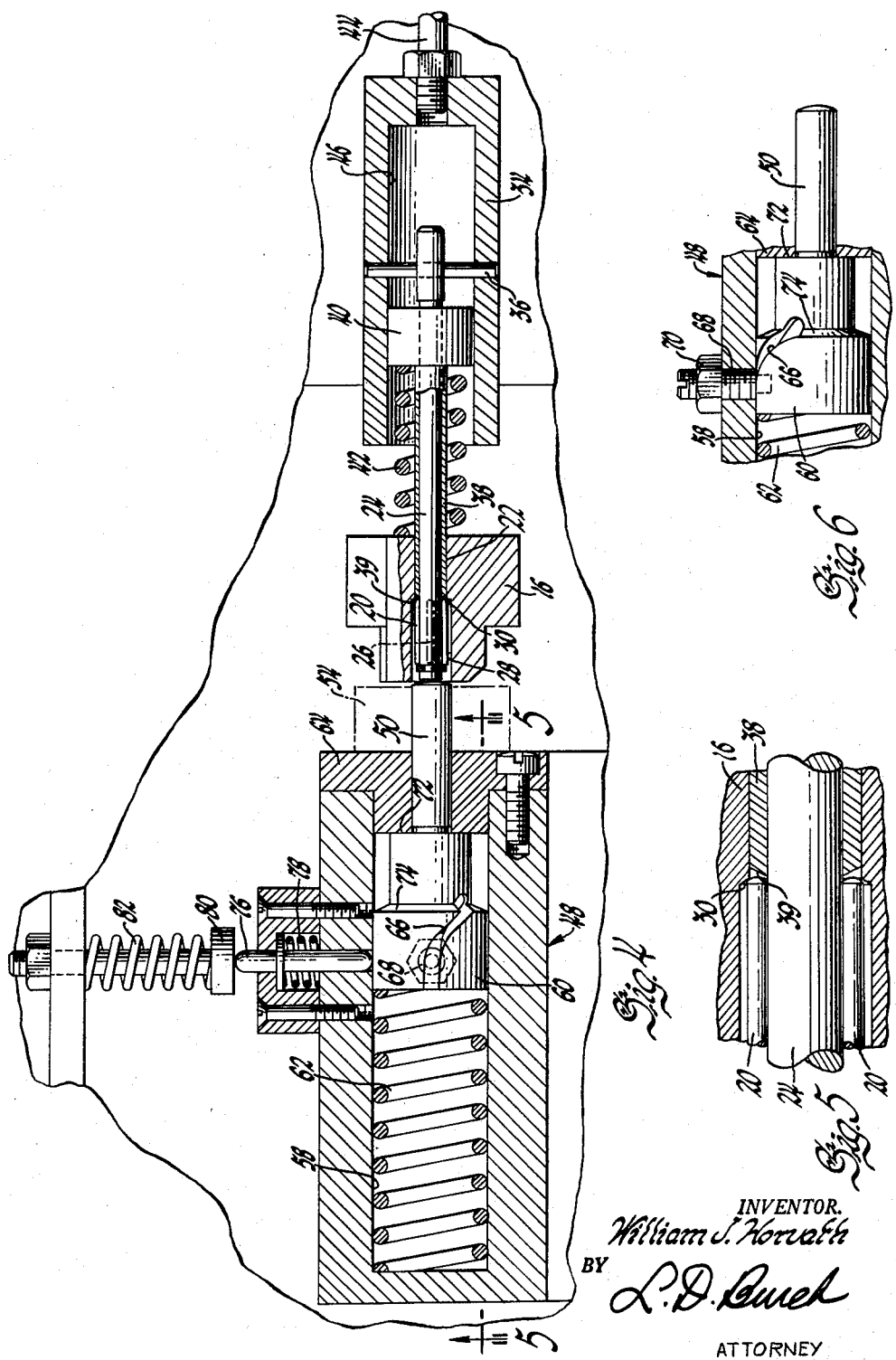

United States Patent Office 2,946,117
Patented July 26, 1960

2,946,117

ASSEMBLY MACHINE

William J. Horvath, Inkster, Mich., assignor to General Motors Corporation, Detroit, Mich., a corporation of Delaware Filed July 26, 1955, Ser. No. 524,321

8 Claims. (Cl. 29—201)

This invention relates to assembly machines in general and more particularly to roller bearing assembly machines and means for keystoning roller bearings or the like within a receiving member.

Roller bearing assembly machines, in present use, generally provide an annulus of roller bearings about a pilot member and then axially move the ring of bearings within a bearing receiving receptacle, having either a dummy pin within the receptacle to hold the bearings or a continuously rotating bearing loading means to effect a keystoning of the bearings within the receiving member. The use of a dummy pin is not entirely acceptable since a loose fitting pin requires more careful handling and a tight fitting pin chances damaging the bearings and makes the final assembly operation more difficult. At the same time, the use of a continuously rotating bearing loading mechanism, to effect a keystoning of the bearings within a receiving member, requires a more complicated and expensive assembly machine subject to more frequent breakdowns, maintenance and repair problems.

It is an object of this invention to provide improved means for loading roller bearings or the like within a receiving member.

It is also an object of this invention to provide improved means for keystoning roller bearings or the like within a receiving member.

It is a further object of this invention to provide bearing loading means which do not require the use of disposable dummy pins or require the undue operation of movable parts during inoperative periods.

It is a still further object of this invention to provide improved bearing loading means which are less complicated than similar means in present use, require less maintenance and are less subject to failure.

It is also an object of this invention to provide means which are adaptable for use with present bearing loading machines and which may be incorporated therein without requiring extensive revision to existing equipment or long periods of inoperativeness to make the necessary modifications.

In the drawings:

Figure 1 is a side view of a part of a roller bearing assembly machine including the present invention.

Figure 2 is an enlarged side view of part of the roller bearing assembly means incident to the present invention.

Figure 3 is the same as Figure 2, showing the roller bearings extracted from the bearing feed device.

Figure 4 is an enlarged cross-sectional view of the proposed device taken in the plane of line 4—4 of Figure 1 looking in the direction of the arrows thereon.

Figure 5 is a cross-sectional view of a feature of the present invention as viewed in the plane of line 5—5 of Figure 4 looking in the direction of the arrows thereon, to illustrate the manner in which the bearing members are prepared for assembly.

Figure 6 is a view of a feature of the present invention with parts broken away and in section to illustrate the means for keystoning the bearing members in the supporting piece.

The present invention is here shown incorporated within a roller bearing assembly machine which has been greatly simplified for illustration purposes. Such simplification is not intended to limit the scope of the present invention in any manner or form.

The roller bearing assembly machine 10 is shown to include a base 12 having roller bearing feed means 14 secured thereto. The feed means includes a support member 16 to which is connected a roller bearing feed chute 18 having an orderly column of adjacently disposed roller bearings 20 maintained therein. Within the support member 16, there is provided a bore 22 within which is disposed a pilot member 24 about which roller bearings 20 are circumferentially fed through an elongated access 26 provided through the support and which is the size of one of the roller bearings. Once an annulus of bearings is disposed about the pilot member, the feed thereto is cut off. The bore 22 is slightly enlarged as at 28 to accommodate the roller bearings 20 and is chamfered as at 30 to prevent axial movement of the bearings beyond the enlarged part of the bore. A compressible snap or O ring 32 is also disposed about the end of the pilot member to restrain unintentional axial movement of the bearing members in the other direction.

The pilot member 24 extends within a control cylinder 34 spaced apart from support 16 and is secured against axial movement by means such as pin 36. A sleeve member 38 is concentrically disposed about the pilot member 24 and extends within the bore 22 and within the control cylinder 34, where it includes piston head 40. Spring means 42 disposed about the sleeve member and engaging the support member 16 and piston head 40 biases the sleeve in a retracted position removed from the bearing receiving portion 28 of bore 22. An air fitting 44 provided in the end of cylinder 34 admits air pressure within chamber 46 which acts upon the piston head 40 to move the sleeve member 38 to engage the annulus of roller bearings disposed about the pilot member 24. The end of the sleeve is chamfered as at 39 to force the pins radially outward in the course of axial movement thereof.

Spaced apart from the roller bearing feed means 14 is a housing 48 having a retractable support pin 50 extended towards the feed device. The housing 48 is movable relative to the feed device 14 on guideway 52 to permit placing a bearing receiving member or receptacle 54, shown in phantom in Figures 3 and 4, on the pin 50 and then moving the member into alignment with the feed device. Limit stop means 56, which engages guideway 52, is provided on housing 48 to assure the proper repositioning of the housing adjacent the feed device.

The housing 48 includes a bore 58 within which is disposed a plunger 60 biased by spring means 62 to normally extend through end wall 64 to provide the retractable support pin 50. The plunger 60 includes a spiral cam groove 66 formed therein which receives a guide pin 68 provided through the side wall of housing 48 and set by lock nut 70. Axial travel of the plunger thus includes rotational movement in accord with the dictate of the cam groove 66. The plunger 60 includes a shoulder 72 engaging end wall 64 to limit its outwardly biased travel and a shoulder 74 engaged by a detent 76 extended through the side wall of housing 48 to retain the pin 50 in a retracted position. Detent 76 is normally biased by spring means 78 out of engagement with plunger 60. However, when the housing 48 is positioned adjacent the feed device 14, a biased stop 80 including spring means 82 is engaged by the detent, overcoming the retracting force of spring 78 and biasing the detent in engagement with the plunger.

In operation, the movable housing 48 is disposed to receive a bearing receptacle 54 upon the retractable pin 50 and is then moved on guideway 52 to the limits of stop 56 to dispose the housing and pin in axial alignment with the pilot member 24 of the feed device 14. In such position the detent 76 is engaged by stop 80 to hold the detent engaged with the plunger 60.

During the loading of the bearing receiving member 54 upon support pin 50, roller bearings 20 are circumferentially arranged about pilot member 24 to form an annulus of roller bearings which are to be loaded within the receiving member by the sleeve member 38 disposed therebehind.

With housing 48 in position, air is admitted to chamber 46 of control cylinder 34 to act on piston head 40 and move sleeve 38, guided within bore 22 and upon the pilot member 24, to engage the roller bearings disposed about the pilot member and move them axially towards O ring 32. The annulus of bearings 20 compresses the snap ring 32 and moves on to engage the retractable support 50 which holds the bearing receiving member 54. As the bearings are moved into member 54 and the pin 50 is displaced, plunger 60 is moved back into housing 48 against the force of spring 62 and is rotated by guide pin 68, engaged in cam groove 66. The support pin 50 being engaged with one end of the roller bearings and being rotated while the sleeve member 38 is not rotated, effects a circumferential displacement of the ends of the roller bearings engaging the rotating pin 50 and keystones the bearings within the receiving member 54.

A plurality of cylindrical members, as are needle roller bearings, which are annularly disposed, will be in a keystoned relation if positively and firmly engaged with each next adjacent cylindrical member in the manner of an arch keystone from which the word keystoning originated. The difficulty which has been experienced in such a keystone bond with needle roller bearings is that certain tolerances are required between the diameter of the roller bearings and the width of the annular space within which they are first loaded, and between the roller bearings themselves, to facilitate their loading. These tolerances, in turn, minimize the effectiveness of the keystone bond since the roller bearings may be expanded outwardly, as by a severe jolt, and allow one of the bearings to fall through and break the bond.

By circumferentially displacing the ends of the annularly disposed roller bearings in opposite directions the ends of the roller bearings are moved radially outward to take up the tolerance provided in the annular loading space, or the receiving member, and the portion of the bearings intermediate the ends is moved radially inward to take up the tolerance provided between the bearings which facilitates adjacent loading. With the ends of the roller bearings frictionally engaged with the inner surface of a member within which received and the intermediate portions of the roller bearings positively engaged with each next roller bearing, the keystone bond is made secure.

The chamfered ends of the retractable support pin 50 and of the cylindrical loading sleeve 38 assure that the ends of the needle roller bearings will be urged radially outward in the course of their axial and relative rotational movement to within the bearing receiving member 54. With the rotational movement of the retractable support pin 50 arranged to occur near the end of the travel movement of the roller bearing within the receiving member, adequate tolerances may be provided to facilitate greater ease in loading the roller bearings within the receiving member and at the last minute such tolerances may be taken up in the manner proposed.

Upon the final displacement of pin 50 from the bearing receiving member 54, at which time the roller bearings are properly held by keystoning therein, the loaded member 54 is free to drop into a receiving basket or the like. At such time shoulder 74 of plunger 60 is engaged by detent 76 and held in a retracted position. The return of sleeve 38 to its orginal position, by exhausting air from chamber 46 to permit spring 42 to effect the return, may be used to signal the return of housing 48 to a position where another bearing receiving member may be received. As the housing is moved away from stop 56 detent 76, being released from stop 80, is retracted by spring 78 and plunger 60 is moved forward by spring 62 until shoulder 72 engages wall 64 and pin 50 is positioned to receive another bearing receptacle.

I claim:

1. In a roller bearing assembly machine, means for receiving an annulus of roller bearings and for engaging and axially moving said roller bearings within a bearing receiving receptacle, retractable means for receiving and supporting said bearing receiving receptacle adjacent said first-mentioned means, said last-mentioned means being axially displaced from said receptacle by said first-mentioned means in disposing said roller bearings within said receptacle and in engagement therewith, and means engaging one of said aforementioned means for rotating said one means during axial travel thereof, said one means circumferentially displacing the ends of said roller bearings engaged therewith and displacing opposite ends of said roller bearings in opposite relative directions and radially outward for more positively keystoning said roller bearings within said receptacle.

2. In a roller bearing assembly machine, means for receiving an annulus of roller bearings and for engaging and axially moving said roller bearings within a bearing receiving receptacle, retractable means for receiving and supporting said bearing receiving receptacle adjacent said first-mentioned means, said last-mentioned means being axially displaced from said receptacle by said first-mentioned means in disposing said roller bearings within said receptacle and in engagement therewith, and cam groove means provided upon one of said aforementioned means for rotating said one means during axial travel thereof, said one means circumferentially displacing the ends of said roller bearings engaged therewith and displacing opposite ends of said roller bearings in opposite relative directions and radially outward for more positively keystoning said roller bearings within said receptacle.

3. In a roller bearing assembly machine including apparatus for circumferentially disposing a plurality of roller bearings about a pilot member, retractable means for receiving and supporting a bearing receiving receptacle in axial alignment with said pilot member, means for axially moving said roller bearings to within said bearing receiving receptacle and for axially displacing said retractable means therefrom, and means engaging one of said aforementioned means for rotating said one means during axial travel thereof, the rotation of said one means by said last-mentioned means circumferentially displacing the ends of said roller bearings engaged therewith and displacing opposite ends of said roller bearings in opposite relative directions and radially outward for more positively keystoning said roller bearings within said receptacle.

4. In a roller bearing assembly machine including apparatus for circumferentially disposing a plurality of roller bearings about a stationary pilot member, retractable means for receiving and supporting a bearing receiving receptacle in axial alignment with said pilot member, means for axially moving said roller bearings to engage and axially displace said retractable means from said receptacle, and cam groove means provided upon one of said aforementioned means for rotating said one means during axial travel thereof for circumferentially displacing the ends of said roller bearings engaged therewith and displacing opposite ends of said roller bearings in opposite relative directions and radially outward for more positively keystoning said roller bearings within said receptacle.

5. In a roller bearing assembly machine, means for receiving an annulus of roller bearings and for axially moving said roller bearings into a bearing receiving receptacle, retractable means for receiving and supporting a bearing receiving receptacle in axial alignment with said first-mentioned means, said retractable means being engaged and displaced from said receptacle by said bearing means moved within said receptacle by said first-mentioned means, and means engaging said supporting means for rotating said supporting means during axial displacement thereof for circumferentially displacing the ends of said roller bearings engaged therewith and displacing opposite ends of said roller bearings in opposite relative directions and radially outward for more positively keystoning said roller bearings within said receptacle.

6. In a roller bearing assembly machine including means for disposing an annulus of roller bearings about a stationary pilot member, sleeve means concentrically disposed about said pilot member for axially moving said roller bearings within a bearing receiving receptacle, retractable support means for disposing a bearing receiving receptacle in axial alignment with said sleeve means and said annulus of roller bearings, said support means being engaged by the ends of said roller bearings and axially displaced from said receptacle by said roller bearings, and cam groove means provided upon said support means for rotating said support means during axial displacement thereof for circumferentially displacing the ends of said roller bearings engaged therewith and displacing opposite ends of said roller bearings in opposite relative directions and radially outward for more positively keystoning said roller bearings within said receptacle.

7. In a roller bearing assembly machine including apparatus for circumferentially disposing a plurality of roller bearings about a pilot member, retractable means for receiving and supporting a bearing receiving receptacle in axial alignment with said pilot member, sleeve means concentrically disposed about said pilot member for axially moving said roller bearings into said bearing receiving receptacle, said roller bearings engaging said receptacle support means for displacing said support means from said bearing receiving receptacle, and means engaging one of said aforementioned means for rotating said one means during axial travel thereof to circumferentially displace the ends of said roller bearings engaged therewith and displacing opposite ends of said roller bearings in opposite relative directions and radially outward for more positively keystoning said roller bearings within said receptacle.

8. In a roller bearing assembly machine including means for circumferentially disposing a plurality of roller bearings about a stationary pilot member, a sleeve member concentrically disposed about said pilot member for engaging the ends of said roller bearings and for axially moving said roller bearings into a bearing receiving receptacle, retractable support means for receiving a bearing receiving receptacle in axial alignment with said sleeve member, said support means being axially retractable from said bearing receiving receptacle by the engagement therewith of said roller bearings being moved within said receptacle by said sleeve means, and means for rotating said support means during axial travel thereof for circumferentially displacing the ends of said roller bearings engaged therewith and displacing opposite ends of said roller bearings in opposite relative directions and radially outward for more positively keystoning said roller bearings within said receptacle.

References Cited in the file of this patent

UNITED STATES PATENTS

| | | |
|---|---|---|
| 2,031,417 | Ketcham et al. | Feb. 18, 1936 |
| 2,160,382 | Heim | May 30, 1939 |
| 2,204,655 | Booty | June 18, 1940 |
| 2,215,134 | Rehnberg | Sept. 17, 1940 |
| 2,222,605 | Carlson | Nov. 26, 1940 |
| 2,449,942 | Johnson | Sept. 21, 1948 |
| 2,741,015 | Young | Apr. 10, 1956 |